(12) United States Patent
Edvardsson

(10) Patent No.: US 7,518,548 B2
(45) Date of Patent: Apr. 14, 2009

(54) METHOD FOR DETERMINING QUALITY OF MEASUREMENT IN A RADAR LEVEL GAUGE SYSTEM

(75) Inventor: Olov Edvardsson, Linköping (SE)

(73) Assignee: Rosemount Tank Radar AB, Goteborg (SE)

( * ) Notice: Subject to any disclaimer, the term of this patent is extended or adjusted under 35 U.S.C. 154(b) by 139 days.

(21) Appl. No.: 11/300,847

(22) Filed: Dec. 15, 2005

(65) Prior Publication Data

US 2007/0139256 A1 Jun. 21, 2007

(51) Int. Cl.
G01S 13/08 (2006.01)
G01S 13/00 (2006.01)

(52) U.S. Cl. ............................ 342/124; 342/85; 342/142

(58) Field of Classification Search ................. 342/142, 342/85, 124
See application file for complete search history.

(56) References Cited

U.S. PATENT DOCUMENTS

| | | | | |
|---|---|---|---|---|
| 4,776,391 A * | 10/1988 | Warner | ........................ | 165/111 |
| 5,614,911 A | 3/1997 | Otto et al. | ..................... | 342/124 |
| 5,689,265 A * | 11/1997 | Otto et al. | ..................... | 342/124 |
| 5,959,570 A * | 9/1999 | Russell | ........................ | 342/70 |
| 6,310,579 B1 * | 10/2001 | Meredith | ..................... | 343/703 |
| 6,611,150 B1 * | 8/2003 | Stevens | ....................... | 324/613 |
| 6,611,227 B1 * | 8/2003 | Nebiyeloul-Kifle et al. | . | 342/173 |
| 2004/0080324 A1 * | 4/2004 | Westerling et al. | .......... | 324/644 |

* cited by examiner

*Primary Examiner*—Thomas H Tarcza
*Assistant Examiner*—Harry Liu
(74) *Attorney, Agent, or Firm*—Westman, Champlin & Kelly, P.A.

(57) ABSTRACT

A method for determining a quality of measurement in a radar level gauge system arranged to measure a filling level of a content contained in a tank, comprising the steps of providing an antenna having at least two separate antenna functions, including a transmitting function and a receiving function, transmitting microwave energy from said transmitting function of said antenna, receiving a reflected part of said microwave energy, reflected from said level of content to be gauged, using said receiving function of said antenna, detecting a leakage signal, said leakage signal leaking from said transmitting function of said antenna to said receiving function of said antenna, and determining, based on a relationship between said leakage signal and said reflected signal, a level of quality of said reflected signal. An advantage with the above method is its improved accuracy when determining the level of quality, since there is no need for a separate reference reflection point.

26 Claims, 4 Drawing Sheets

Two-way attenuation in dB vs thickness in mm

Reflection factor in dB vs thickness in mm

METHOD FOR DETERMINING QUALITY OF MEASUREMENT IN A RADAR LEVEL GAUGE SYSTEM

TECHNICAL FIELD OF THE INVENTION

The present invention relates to a method for determining quality of measurement in a radar level gauge system arranged to measure a filling level of a content contained in a tank. The invention further relates to a radar level gauge system for performing such a method.

BACKGROUND OF THE INVENTION

The process control and the transport industry employs process parameter gauges to monitor process parameters associated with substances such as solids, liquids and gasses in industries directed to chemicals, petroleum, pharmaceuticals, food, etc. Process parameters include pressure, temperature, flow, level, chemical composition and other properties. For measuring a level of a material contained in a tank, radar level gauge systems are often used. These systems normally employ a transmitter to transmit microwave energy, an antenna to guide the microwave energy, and a receiver to receive, as a reflection from the level to be gauged, a fraction of the transmitted microwave energy. The antenna here provides for noninvasive measurements.

As tank content, especially in the transport industry, generally are exposed to motion, the material in the tank can potentially come in contact with the antenna, possibly creating a thin layer of deposit on the antenna. Further, damp and condensate may easily generate deposits on antenna surfaces. The dielectric antenna parts typically have a necessary seal function and are penetrated by the radar signal and thus any attenuation by the passage will degrade the performance. In most cases materials like polytetrafluoroethylene (PTFE), which are difficult to wet by condensation, are used as the condensation on such a surface will form droplets with minor influence on the radar signal as long as the droplets are small (circumference<<wavelength). With deposits from the material in the tank, a continuous layer or a thicker layer can be formed and due to the dielectric properties of water (very high dielectric constant and high losses) even a few tenths of a mm may more or less stop the function. It is easily understood that this layer of deposit will create quality problems in relation the measurements, such as initially a small attenuation of the reflected microwave energy, and eventually a complete attenuation of the reflected microwave energy. There is therefore a need for a method to in advance indicate whenever such and similar problems occur.

U.S. Pat. No. 5,614,911 addresses this problem by using a method for level measurement on a radar basis, where microwaves are emitted by means of an antenna to the surface of a material in a container and the echo waves reflected from the surface thereof are received. To recognize the formation of a deposit and/or other trouble, such as e.g. damage to or loss of the antenna, an undisturbed echo function corresponding to an undisturbed measurement is obtained and stored prior to performing the measurements. In each measurement the actual echo function is compared to the stored undisturbed echo function. When due to the comparison, deviations between the two functions are found in the antenna region and the proximity zone, these deviations are evaluated to recognize the formation of a material deposit and/or other trouble. However, in many situations this known method is unsatisfactory, and/or unreliable. For example, since this method compares an "ideal" reference with a "real", subsequent value (measured continuously) environmental variations occurring there between, such as temperature variations, will not be correctly taken into account. Hence, false alarms indicating deposit and/or other trouble may occur.

Another document, U.S. Pat. No. 5,689,265, also proposes a level measuring device using microwaves, wherein the formation of deposits of the material on the antenna or further trouble conditions, such as damage to the antenna or the loss thereof, is detected. To this end, the level measuring device comprises an arrangement which compares a section of the echo function originating from a reference reflection point in the antenna or in the vicinity of the antenna with a predetermined threshold value and produces a signal indicating the existence of a state above or below the said threshold value. The reference reflection point may be constituted by a part of the antenna or a separate reference reflector mounted in the antenna or in the vicinity thereof. A problem with this system is that the antenna has to be constructed in such a way that this special reference reflection point is present in the antenna area, thereby leading to complicated and costly constructions. Furthermore, the use of close reference points has shown to be unfavorable as the close distance resolution is relatively unreliable.

There is therefore a need for an improved method for in advance indication of whenever a problem regarding quality of measurement relating to deposit on an antenna exists. Hence, the object of the present invention is therefore to provide an improved method, for determining quality of measurement in a radar level gauge system, that provides a solution to at least some of the above-mentioned problems.

SUMMARY OF THE INVENTION

This object is achieved by means of a method for determining quality of measurement in a radar level gauge system arranged to measure a filling level of a content contained in a tank as defined in claim 1, a method for measuring a filling level of a content contained in a tank as defined in claim 8, and a radar level gauge system as defined in claim 15. The appended sub-claims define advantageous embodiments in accordance with the present invention.

According to a first aspect of the present invention, there is provided a method for determining a quality of measurement in a radar level gauge system arranged to measure a filling level of a content contained in a tank, comprising the steps of providing an antenna having at least two separate antenna functions, including a transmitting function and a receiving function, transmitting microwave energy using said transmitting function of said antenna, receiving a reflected part of said microwave energy, reflected from said level of content to be gauged, using said receiving function of said antenna, detecting a leakage signal, said leakage signal leaking from said transmitting function of said antenna to said receiving function of said antenna, and determining, based on a relationship between said leakage signal and said reflected signal, a level of quality of said reflected signal.

By means of the above method, an improved accuracy when determining the level of quality is achieved, since there is no need for a separate reference reflection point, comparison with a reference value or the like. Furthermore, the above method provides for a way of counteracting the possible problems when the antenna surface is covered with deposits from the content in the tank. Hereby, the quality of measurement can be determined without being significantly affected by environmental changes, such as temperature variations.

Well known conventional radar systems use one common antenna function having the disadvantages of for instance decreased sensitivity (in the order of 10 dB) and/or expensive components. The method according to the present invention is therefore preferably implemented in a radar level gauge system where the antenna has at least two separate antenna functions used as "transmitting antenna" and "receiving antenna". These separate antenna functions may be mechanically, electrically and physically separated, but may also be electrically insulated while being mechanically integrated. For instance, a circularly polarized antenna can be used, where the different TX (transmit) and RX (receive) antenna functions (right hand circular polarization and left hand circular polarization, abbreviated RHCP and LHCP) keep the signal apart. One important feature of circularly polarized waves in connection with radar level gauging is that the wave changes its polarization (horn RHCP to LHCP or vice versa) at the reflection of the content contained in the tank (or any rotationally symmetric object), which enables the use of two separated antenna functions for radar level gauging (in contras to conventional radar). Two perpendicular linear polarizations (or in general sense orthogonal) may be used for the same purpose, and U.S. Pat. No. 5,543,720, assigned to the assignee of the present invention and incorporated by reference herein, gives one example of two separated antenna functions radar level gauge.

The expression "leakage" is in the context of this application understood to represent the microwave leakage between the two antenna functions, i.e. the microwave energy passing between the antenna functions without being reflected by surfaces in the tank interior. The use of two antenna functions provides for higher accuracy and a more straightforward measurement procedure.

According to one embodiment of the present invention, the steps of transmitting, receiving, detecting and determining are performed continuously over time. This provides for extended possibilities in regards to quality measurements as it will be possible to follow trends and effects occurring over time, or in turn so a comparison between different signals can be done with a delay comparable to the rate of updating of the measurement. The expression continuously is in the context of this application understood to mean that the above mentioned steps are preformed continuously during use of the radar level gauge system.

To achieve accurate measurements, a time between execution of the steps of receiving and detecting is less than 2 hours, more preferably less than 30 minutes and most preferably less than 60 seconds. By minimizing the time between the steps of receiving and detecting, one can ensure that a high quality of the signal is achieved. Furthermore, no changes in temperature etc. can be expected during short time intervals.

In a preferred embodiment, the step of determining comprises the steps of calculating a quotient between the leakage signal and the reflected signal, and comparing said quotient with a pre-determined allowable quality measurement range, wherein an alarm is produced if the quotient goes outside the allowable quality measurement range. As understood by a person skilled in the art, this will provide for the possibility to an in advance indication of whenever an error condition exists, such as for example problem regarding quality of measurement related to unwanted deposits on an antenna. As the quotient comparison is preferably continuously or intermittently performed over time, the above described problems with temperature variations in and around the tank can be handled in an advantageous manner. As understood by a person skilled in the art, comparisons should preferably be performed within short intervals, where short is here understood to be in the range of seconds, minutes or hours, during which no changes in temperature etc. can be expected. Prior art typically uses a comparison with an echo signal recorded a long time ago (maybe weeks or months when the tank was clean and empty) which makes the comparison much less sensitive for changes. It is preferred to calculate the quotient between the leakage signal and the reflected signal using the absolute values of the signals.

In yet another preferred embodiment, the step of determining comprises the steps of calculating a variation over time based on a quotient between said leakage signal and said reflected signal, and comparing said variation over time with a pre-determined allowable quality measurement range, wherein an alarm is produced if said rate of change goes outside said allowable quality measurement range. Hence, in relation to the above described preferred embodiment, this provides for the possibility to an in advance indication of whenever an error condition exists, such as for example problems regarding level of quality relating to deposits on an antenna.

Further, the antenna is preferably one of a horn antenna, a reflector mirror antenna, a dielectric rod antenna and an array antenna. The antenna is preferably covered by a material resistant to corrosivity, selected from a group comprising fluoroplastic materials, PTFE (polytetrafluoroethylene), PPS (polyphenylenesulfid), PEEK (polyetheretherketone) FEP (fluorinated ethylene propylene), PFA (perfluoroalkoxy), HALAR and Metalon. It is to be appreciated by the skilled addressee that the use of for example fluoroplastic materials will prolong the lifetime of the antenna. Furthermore, the combination of deposits and condense, which often occurs inside of a tank, will provide for a faster adhering effect on the antenna as the deposit will serve as a fastener for the condensation, resulting in quick changes to the level of quality of the reflected part of the microwave energy. This problem can be alleviated by using e.g. an antenna designed in a "drip-off" manner in combination with a fluoroplastic materials surface cover, thereby minimize the amount of deposit that will adhere to the antenna as condensation will have problem remaining on the antenna surface. As understand, other materials showing similar properties could also serve as antenna surface cover. However, should the problem still occur, the present invention will be efficient in detecting such an error condition, whereby appropriate corrective actions can be taken.

In still yet another preferred embodiment, the phase information of the transmitted and received microwave energy is further considered when determining and analyzing the leakage signal. Hereby, an improved distance resolution and improved detection capability is achieved. This is typically done in FMCW-systems and greatly reduces the disturbance from the antenna. However, the same feature can also be used in pulsed system, either if the sampling is made at an adequate rate or if the system works in two modes of which one has a low updating rate under which a possible error condition, such as for example deposit, at the antenna can be detected.

According to a further aspect of the present invention there is provided a method for measuring a filling level of a content contained in a tank, comprising the steps of providing an antenna having at least two antenna functions, including a transmitting function and a receiving function, transmitting microwave energy using said transmitting function of said antenna, receiving a reflected part of said microwave energy, reflected from said level of content to be gauged, using said receiving function of said antenna, calculating a level of content in said tank based on said reflected signal, detecting a leakage signal, said leakage signal leaking from said transmitting function of the antenna to said receiving function of the antenna, and determining, based on a relationship between said leakage signal and said reflected signal, a level of quality of said calculation. This aspect of the invention can be used in a similar and analogue way as described above with reference to the first aspect of the invention, and similar and analogue advantages can be obtained.

According to still a further aspect of the present invention there is provided a radar level gauge system, for measuring a filling level of a content contained in a tank, said radar level gauge system comprising an antenna having at least two antenna functions, including a transmitting function and a receiving function, a transmitter arranged outside said tank and configured to transmit microwave energy using a transmitting function of said antenna, a receiver arranged outside said tank and configured to receive reflected microwave energy, reflected from said level of content to be gauged, using a receiving function of said antenna, a controller arranged to determining a filling level based on said reflected microwave energy, and wherein the controller is further arranged to detect a leakage signal, said leakage signal leaking from said transmitting function of said antenna to said receiving function of said antenna, and to determine, based on a relationship between said leakage signal and said reflected signal, a level of quality of said reflected signal. A radar level gauge system according to this aspect of the present invention provides, in a similar manner as the first and second aspects as described above, advantages in regarding improved accuracy when determining the level of quality of the reflected microwave energy used to determine the level of content to be gauged.

Further features and advantages of the present invention will become apparent when studying the appended claims and the following description. Those skilled in the art will appreciate that different features of the present invention can be combined in various other ways to create embodiments other than those described in the following.

BRIEF DESCRIPTION OF THE DRAWINGS

By way of example, the present invention will now be described in more detail with reference to the accompanying drawings, in which.

DETAILED DESCRIPTION OF THE EMBODIMENTS

Figure 1:
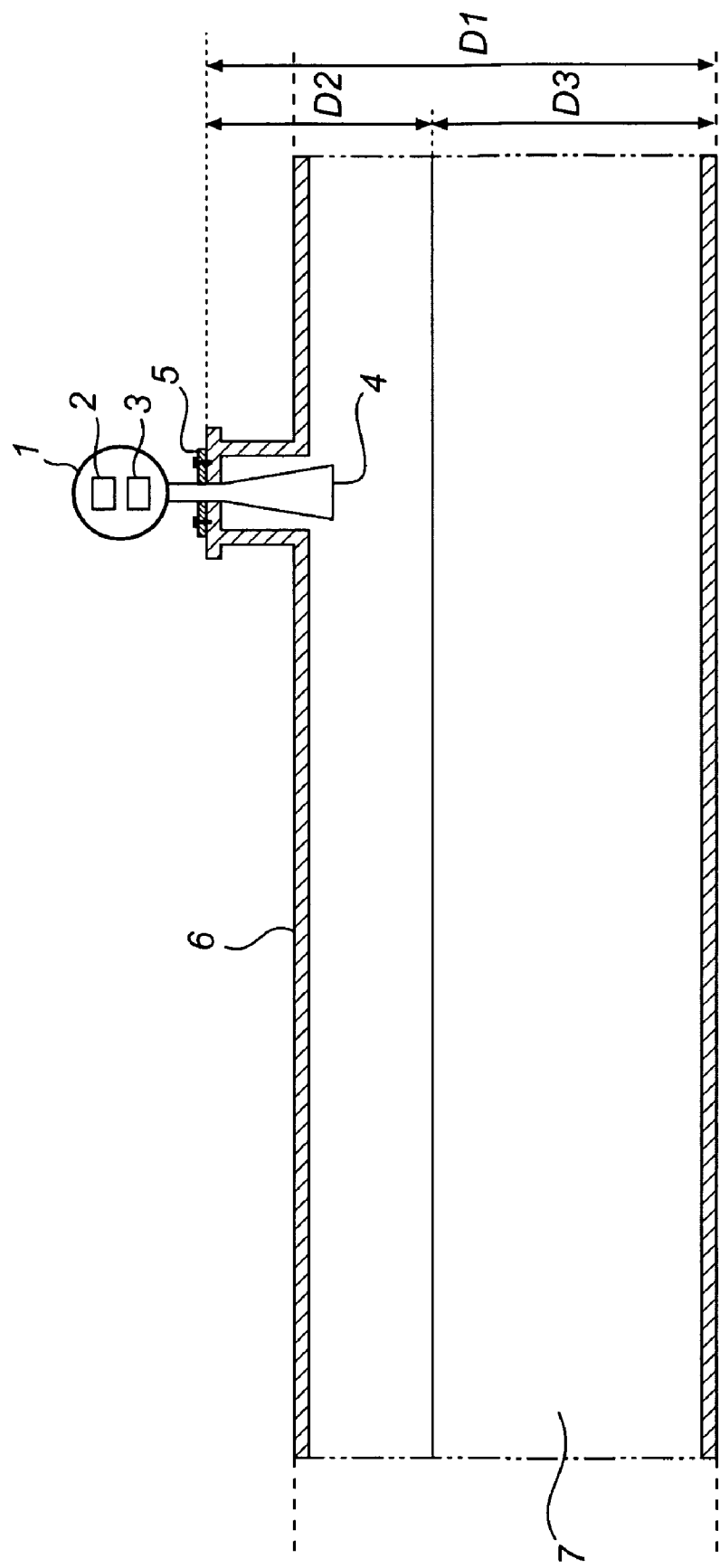
FIG. 1 illustrates a radar level gauge system according to the present invention, installed onto a tank.

In the present description, like reference numerals identify corresponding or similar structures and components.

In FIG. 1, an example of a radar level gauge system according to the present invention is shown. Here, a radar level gauge system 1, comprising a controller 2, a combined transmitter-receiver 3, and an antenna 4 has been installed onto a tank 6, using a fastener 5. The tank 6 can be either a land or sea-based tank. The radar level gauge system 1 is arranged to measure a level of a content or filling material 7 in the tank 6, by means of transmission and reception of microwave energy.

Figure 2:
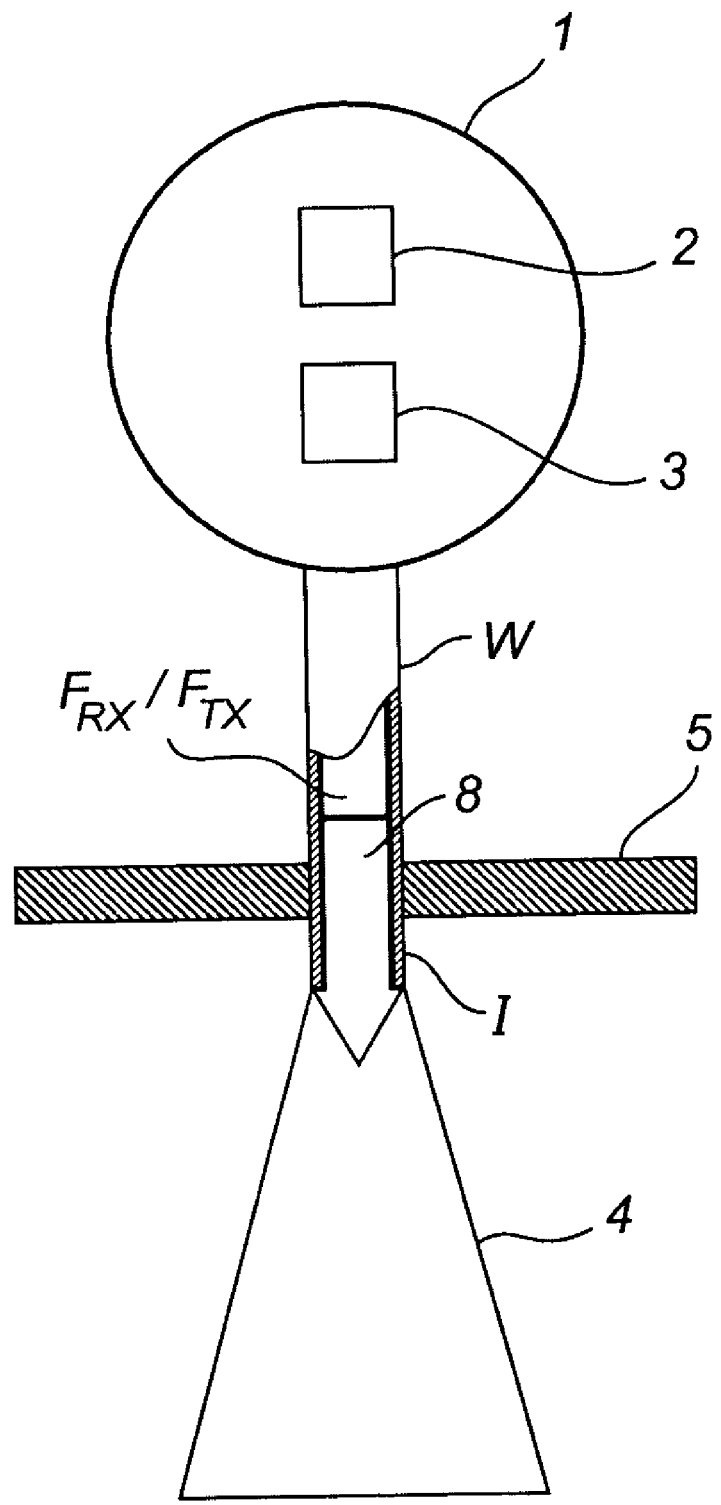
FIG. 2 illustrates a detailed view of a radar level gauge system according to the present invention.

FIG. 2 illustrates a detailed view of one implementation of the radar level gauge system as shown in FIG. 1. The radar level gauge system 1, comprises a controller 2, a combined transmitter-receiver 3, and an antenna 4. To install the system onto the tank a fastener 5 is used. The fastener 5 can be a flange, a thread or any of the special couplings used in different market segments. The transmitter-receiver 3 is connected to the antenna 4 by means of a waveguide W. comprising two separate antenna functions $F_{TX}$ and $F_{RX}$. The two antenna functions are electrically decoupled by having two orthogonal polarizations in the same circular waveguide. Two examples of such polarizations are RHCP/LHCP and two perpendicular linear polarizations in a circular or quadratic waveguide. $F_{TX}$ and $F_{RX}$ represent transmitting and receiving antenna functions, respectively. During a measurement procedure, pulsed microwave energy will be transmitted from the transmitter part of transmitter-receiver 3 through the waveguide W and antenna function $F_{TX}$, whereby a reflection caused by the level of the content to be gauged 7 will be transmitted back through the antenna function $F_{RX}$ to the receiver part of transmitter-receiver 3. The controller 2, will, e.g. by employing time domain reflectometry (TDR) techniques or FMCW technique, analyze the time from when the microwave energy was transmitted to when the reflections were received, whereby a distance $D_2$ representing the distance from the radar level gauge to the level of the content 7 to be gauged can be calculated. At the lower side of a dielectric seal plug 8 or waveguide filling I, there will occur a leakage from the transmitting waveguide mode $F_{TX}$ to the receiving waveguide mode $F_{RX}$, and that signal will represent a distance $D_1$. The difference $D_2$-$D_1$ can be used to eliminate off-set variations in the system but according to this invention an even more important use is to use the amplitude of the signal corresponding to $D_1$ to judge the degree of contamination of the lower surface of the seal I. As will be discussed below, the reflection from the possible contaminated surface is a very good characteristic measure of the degree of contamination. However, it is to be understood that other level determination models may also be used, and both continuously emitted microwaves (FMCW) pulsed microwaves may be used. The two separated antenna functions can be made by two orthogonal waveguide modes feeding the same antenna horn (as described above in FIG. 2), but the person skilled in the art realizes that various other methods like two coaxial cables feeding the same antenna horn with two orthogonal waveguide modes etc. can be used.

To ensure a high level of quality of the measured distance $D_2$, the microwave leakage between the two antenna functions $F_{TX}$ and $F_{RX}$ are measured. In one embodiment, the controller 2, beside of monitoring the echo strength of the surface echo and the strength other leakage, calculates a quotient between the received microwave energy and the microwave leakage. Controller 2 further compares this quotient with a pre-selected allowable quality measurement range, whereby an alarm is produced if the quotient goes outside the allowable quality measurement range. This alarm is advantageously used to indicate in advance if a problem exists with the antenna, such as if deposits are present on the antenna. In another embodiment, a variation over time is compared with a pre-selected allowable quality measurement range. In the similar manner as above, an alarm is preferably produced if the variation over time goes outside the allowable quality measurement range.

Figure 3A:
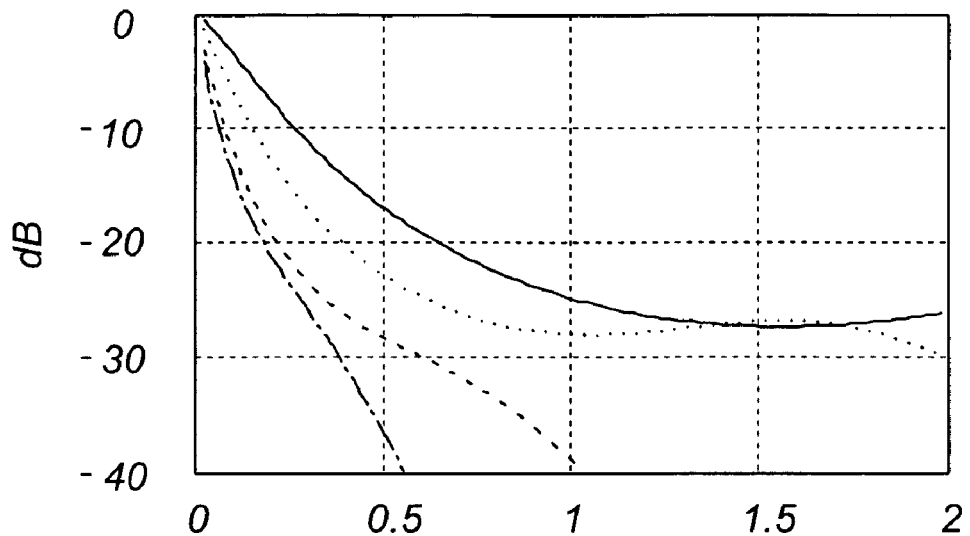
FIG. 3 illustrates two diagrams showing relations between antenna deposit and signal attenuation.
Figure 3B:
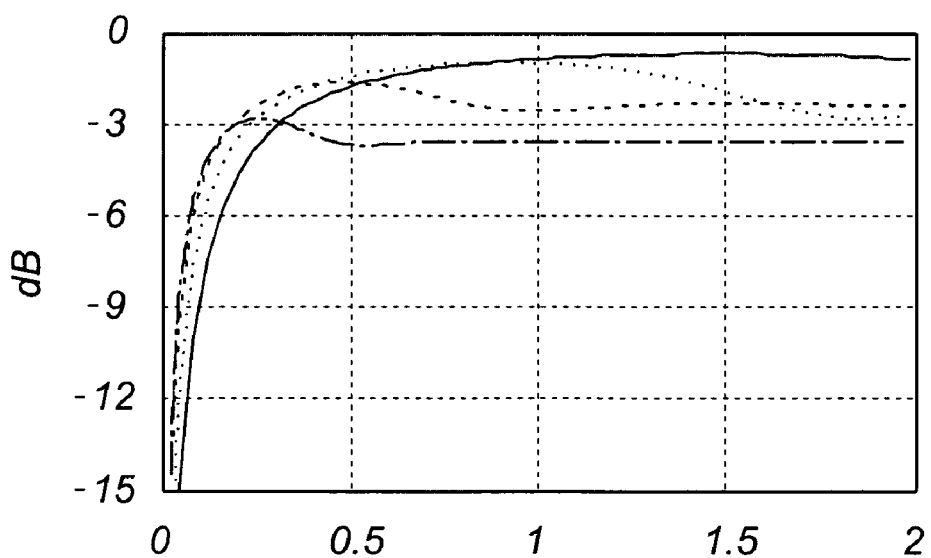

FIG. 3a illustrates, in a diagram, the effect of an error condition, here an antenna deposit, on the resulting microwave energy attenuation. Here a comparison between two-way attenuation (transmission and reception) and thickness of deposit in millimeter is made. The antenna deposit is in this case, as an illustrating example, water, which is representative for a wide category of "wet dirt". Other contaminations with a high dielectric constant will have a similar influence, while pure oil etc. will have much less influence both on attenuation and reflection. One important radar feature is a better resistance to dirt layers, as compared to level sensors using light or sound. In this case, four separate radar frequencies are used, 6, 10, 25 and 77 GHz. As can be seen in the figure, the attenuation is rapidly increasing, even when there is only a thin layer of deposit present (10 dB already at 0, 1 millimeter and 25 MHz). The main source of attenuation, with a thin layer of deposit, is the reflection at the deposit surface, while with a thicker layer of deposit, the main attenuation source is the energy loss while the microwave energy travels through the deposit layer itself. FIG. 3b illustrates, also in a diagram, this relation between thickness of deposit and the present reflection factor.

Figure 4:
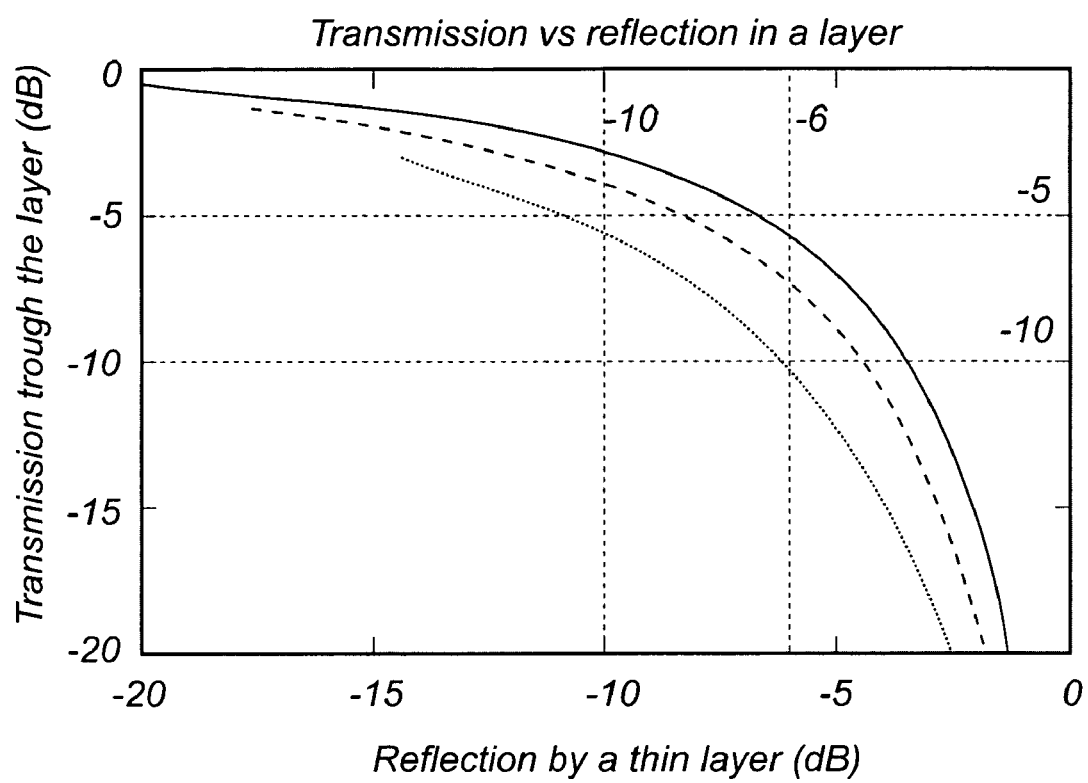
FIG. 4 is a combination of the two diagrams in FIG. 3.

FIG. 4 is a combination of FIGS. 3a and 3b where the transmission loss is plotted versus the reflection factor of the dirty surface for the three frequencies 6, 10 and 25 GHz (absolute values). Without knowledge of the actual thickness and composition of the contamination this diagram tells that there is a good possibility to predict the attenuation of the echo from the surface of the content contained in the tank from a measurement of the reflection in the contaminated surface. For instance, at 6 GHz a reflection of −6 dB or stronger indicates that there is probably more than 5 dB attenuation of the reflection in the content surface. If the reflection should be as strong as −3 dB (VSWR ~6), the attenuation of the surface echo can be expected to be 10 dB. At for instance 25 GHz, the influence is bigger, and the lowest curve in FIG. 4 must be used. The middle curve represents 10 GHz, but all three curves indicates a good possibility to judge the transmission attenuation from the reflection in the dirt layer.

It will be appreciated by the skilled addressee that the herein described radar level gauge system may also be used for other types of per se well-known measurement procedures. Furthermore, it is understood that the present radar level gauge system may be used for many other types of tanks and containers. The person skilled in the art realizes that the present invention is by no means limited to the preferred embodiments described above. On the contrary, many modifications and variations are possible within the scope of the appended claims. For example, the method of determining measurement quality as outlined may be used in essentially all available types of radar level gauging. Further, other pulsed measurement procedures than TDR may be used, or measurement procedures with continuously emitted microwave energy, such as FMCW.

What is claimed is:

1. A method for determining a quality of measurement in a radar level gauge system arranged to measure a filling level of a content contained in a tank, comprising the steps of:
    providing an antenna having at least two separate antenna functions, including a transmitting function and a receiving function;
    transmitting microwave energy using said transmitting function of said antenna;
    receiving a reflected part of said microwave energy, reflected from said level of content to be gauged, using said receiving function of said antenna;
    detecting a leakage signal, said leakage signal leaking from said transmitting function of said antenna to said receiving function of said antenna; and
    determining, based on a variation in a relationship between said leakage signal and said reflected signal over time, a level of quality of said reflected signal.

2. A method according to claim 1, wherein said steps of transmitting, receiving, detecting and determining are performed continuously over time.

3. A method according to claim 1, wherein a time between execution of said steps of receiving and detecting is less than 2 hours, more preferably less than 30 minutes and most preferably less than 60 seconds.

4. A method according to claim 1, wherein said step of determining comprises the steps of:
    calculating a quotient between said leakage signal and said reflected signal; and
    comparing said quotient with a pre-determined allowable quality measurement range, wherein an alarm is produced if said quotient goes outside said allowable quality measurement range.

5. A method according to claim 1, wherein said step of determining comprises the steps of:
    calculating a variation over time based on a quotient between said leakage signal and said reflected signal; and
    comparing said variation over time with a pre-determined allowable quality measurement range,
wherein an alarm is produced if said variation over time goes outside said allowable quality measurement range.

6. A method according to claim 4, wherein said step of calculating a quotient between said leakage signal and said reflected signal is calculated using absolute values of said signals.

7. A method according to claim 1, wherein said antenna is one of a horn antenna, a reflector mirror antenna, a dielectric rod antenna, and an array antenna.

8. A method according to claim 1, wherein said antenna is covered by a material resistant to corrosivity, selected from a group comprising fluoroplastic materials, PTFE, PPS, PEEK, FEP, PFA, HALAR and Metalon.

9. A method according to claim 1, wherein in said step of detecting the leakage signal, the phase information of the transmitted and received microwave energy is further considered.

10. A method for measuring a filling level of a content contained in a tank, comprising the steps of:
    providing an antenna having at least two antenna functions, including a transmitting function and a receiving function;
    transmitting microwave energy using said transmitting function of said antenna;
    receiving a reflected part of said microwave energy, reflected from said level of content to be gauged, using said receiving function of said antenna;
    calculating a level of content in said tank based on said reflected signal;
    detecting a leakage signal, said leakage signal leaking from said transmitting function of the antenna to said receiving function of the antenna; and
    determining, based on a variation in a relationship between said leakage signal and said reflected signal over time, a level of quality of said calculation.

11. A method according to claim 10, wherein at least said steps of transmitting, receiving, detecting and determining are performed continuously over time.

12. A method according to claim 10, wherein a time between execution of said steps of receiving and detecting is less than 2 hours, more preferably less than 30 minutes and most preferably less than 60 seconds.

13. A method according to claim 10, wherein said step of determining comprises the steps of:
    calculating a quotient between said leakage signal and said reflected signal; and comparing said quotient with a pre-determined allowable quality measurement range, wherein an alarm is produced if said quotient goes outside said allowable quality measurement range.

14. A method according to claim 10, wherein said step of determining comprises the steps of:
calculating a variation over time based on a quotient between said leakage signal and said reflected signal; and
comparing said variation over time with a pre-determined allowable quality measurement range,
wherein an alarm is produced if said variation over time goes outside said allowable quality measurement range.

15. A method according to claim 13, wherein said step of calculating a quotient between said leakage signal and said reflected signal is calculated using absolute values of said signals.

16. A method according to claim 10, wherein said antenna is one of a horn antenna, a reflector mirror antenna, a dielectric rod antenna, and an array antenna.

17. A method according to claim 10, wherein said antenna is covered by a material resistant to corrosivity, selected from a group comprising fluoroplastic materials, PTFE, PPS, PEEK, FEP, PFA, HALAR and Metalon.

18. A method according to claim 10, wherein in said step of detecting the leakage signal, the phase information of the transmitted and received microwave energy is further considered.

19. A radar level gauge system, for measuring a filling level of a content contained in a tank, said radar level gauge system comprising:
an antenna having at least two antenna functions, including a transmitting function and a receiving function;
a transmitter arranged outside said tank and configured to transmit microwave energy using a transmitting function of said antenna;
a receiver arranged outside said tank and configured to receive reflected microwave energy, reflected from said level of content to be gauged, using a receiving function of said antenna; and
a controller arranged to determining a filling level based on said reflected microwave energy;
wherein the controller is further arranged to detect a leakage signal, said leakage signal leaking from said transmitting function of said antenna to said receiving function of said antenna and to determine, based on a variation in a relationship between said leakage signal and said reflected signal over time, a level of quality of said reflected signal.

20. A radar level gauge system according to claim 19, wherein said system is arranged to continuously over time perform said quality measurement determination.

21. A radar level gauge system according to claim 19, wherein a time between execution of said steps of receiving and detecting is less than 2 hours, more preferably less than 30 minutes and most preferably less than 60 seconds.

22. A radar level gauge system according to claim 19, wherein said controller is further arranged to:
calculate a quotient between said leakage signal and said reflected signal; and
comparing said quotient with a pre-determined allowable quality measurement range,
wherein an alarm is produced if said quotient goes outside said allowable quality measurement range.

23. A radar level gauge system according to claim 19, wherein said controller is further arranged to:
calculate a variation over time based on a quotient between said leakage signal and said reflected signal; and
comparing said variation over time with a pre-determined allowable quality measurement range,
wherein an alarm is produced if said variation over time goes outside said allowable quality measurement range.

24. A radar level gauge system according to claim 22, wherein said quotient between said leakage signal and said reflected signal is calculated using absolute values of said signals.

25. A radar level gauge system according to claim 19, wherein said antenna is one of a horn antenna, a reflector mirror antenna, a dielectric rod antenna, and an array antenna.

26. A radar level gauge system according to claim 19, wherein said antenna is covered by a material resistant to corrosivity, selected from a group comprising fluoroplastic materials, PTFE, PPS, PEEK, FEP, PFA, HALAR and Metalon.

* * * * *